United States Patent [19]

Bartholomew

[11] Patent Number: 5,551,732
[45] Date of Patent: Sep. 3, 1996

[54] QUICK CONNECTOR

[75] Inventor: Donald D. Bartholomew, Mt. Clemens, Mich.

[73] Assignee: Proprietary Technology, Inc., Bloomfield Hills, Mich.

[21] Appl. No.: 388,397

[22] Filed: Feb. 14, 1995

Related U.S. Application Data

[63] Continuation-in-part of PCT/US93/11281, Nov. 16, 1993.

[51] Int. Cl.$^6$ .................................................. F16L 35/00
[52] U.S. Cl. .................. 285/93; 285/305; 285/381.1; 285/321; 285/308
[58] Field of Search .......................... 285/93, 305, 351, 285/321, 308

[56] References Cited

U.S. PATENT DOCUMENTS

| | | |
|---|---|---|
| 2,467,370 | 4/1949 | Christensen . |
| 3,603,621 | 9/1971 | Parsons . |
| 4,243,254 | 1/1981 | Hill et al. . |
| 4,423,892 | 1/1984 | Bartholomew . |
| 4,524,995 | 6/1985 | Bartholomew . |
| 4,526,411 | 7/1985 | Bartholomew . |
| 4,541,658 | 9/1985 | Bartholomew . |
| 4,573,716 | 3/1986 | Guest . |
| 4,593,943 | 6/1986 | Hanna et al. . |
| 4,601,497 | 7/1986 | Bartholomew . |
| 4,610,468 | 9/1986 | Wood . |
| 4,637,640 | 1/1987 | Feuraler et al. . |
| 4,643,466 | 2/1987 | Conner et al. . |
| 4,669,757 | 6/1987 | Bartholomew . |
| 4,681,351 | 7/1987 | Bartholomew . |
| 4,721,331 | 1/1988 | Lemelshtrich . |
| 4,778,203 | 10/1988 | Bartholomew . |
| 4,810,009 | 3/1989 | Legris . |
| 4,811,975 | 3/1989 | Paul, Jr. et al. . |
| 4,828,297 | 5/1989 | Tarum . |
| 4,832,378 | 5/1989 | Zepp . |
| 4,842,309 | 6/1989 | LaVene et al. . |
| 4,844,515 | 7/1989 | Field . |
| 4,867,484 | 9/1989 | Guest . |
| 4,915,136 | 4/1990 | Bartholomew . |
| 4,936,544 | 6/1990 | Bartholomew . |
| 4,943,091 | 7/1990 | Bartholomew . |
| 4,946,205 | 8/1990 | Washizu . |
| 4,948,175 | 8/1990 | Bartholomew . |
| 4,948,176 | 8/1990 | Bartholomew . |
| 4,979,765 | 12/1990 | Bartholomew . |
| 5,002,315 | 3/1991 | Bartholomew . |
| 5,009,454 | 4/1991 | Bartholomew . |
| 5,033,513 | 7/1991 | Bartholomew . |
| 5,067,754 | 11/1991 | Bartholomew . |
| 5,105,787 | 4/1992 | Imoehl . |
| 5,171,028 | 12/1992 | Bartholomew . |
| 5,209,523 | 5/1993 | Godeau ........................ 285/93 |
| 5,226,679 | 7/1993 | Klinger ........................ 285/93 |
| 5,342,099 | 8/1994 | Bahner et al. ............... 285/93 |
| 5,425,556 | 6/1995 | Szabo .......................... 285/93 |
| 5,441,313 | 8/1995 | Kalanastivy ................ 285/93 |

FOREIGN PATENT DOCUMENTS 1391023  1/1965  France .

*Primary Examiner*—Eric K. Nicholson
*Attorney, Agent, or Firm*—Harness, Dickey & Pierce, P.L.C.

[57] ABSTRACT

A quick connector has a pair of waist segments, a shoulder segment, a body segment with an aperture therein, and a leg segment. The leg segment is defined by a pair of projecting elements which are at least partially compressible toward one another thereby causing the pair of waist segments to move toward one another. Thus, a swivelable connection is made which has the equivalent length and diameter of a convention nonswivelable threaded coupling. The quick connector may be released by hand or a snap ring tool inserted into holes.

4 Claims, 4 Drawing Sheets

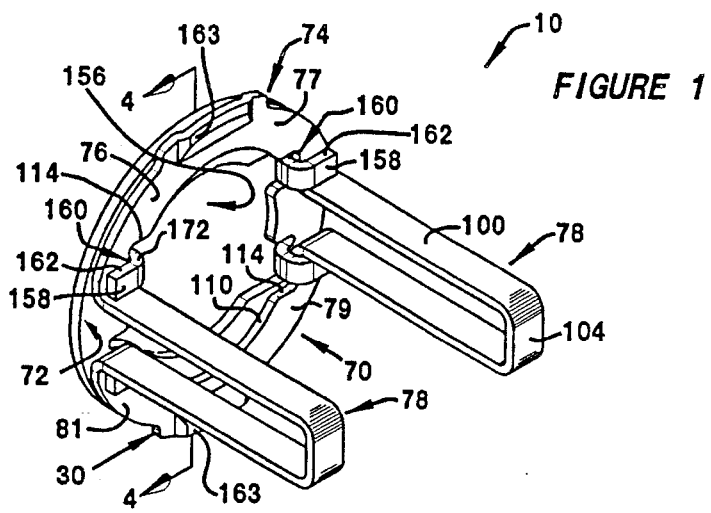
FIGURE 1
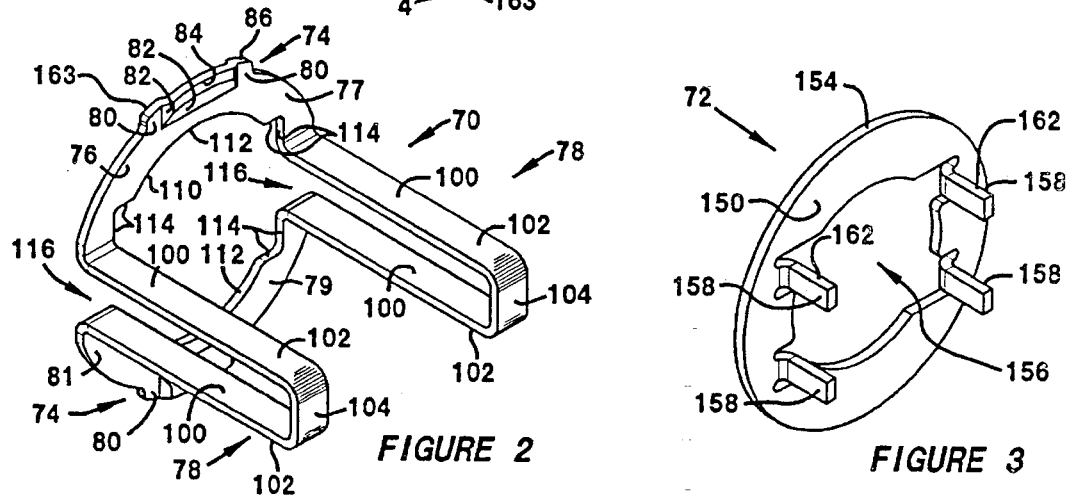
FIGURE 2
FIGURE 3
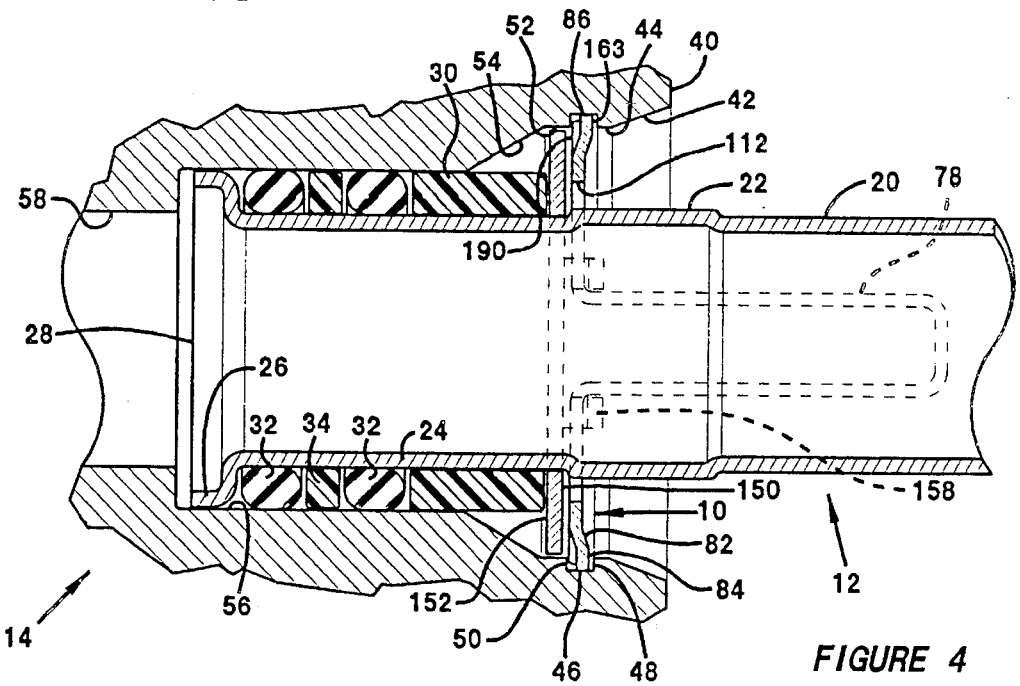
FIGURE 4

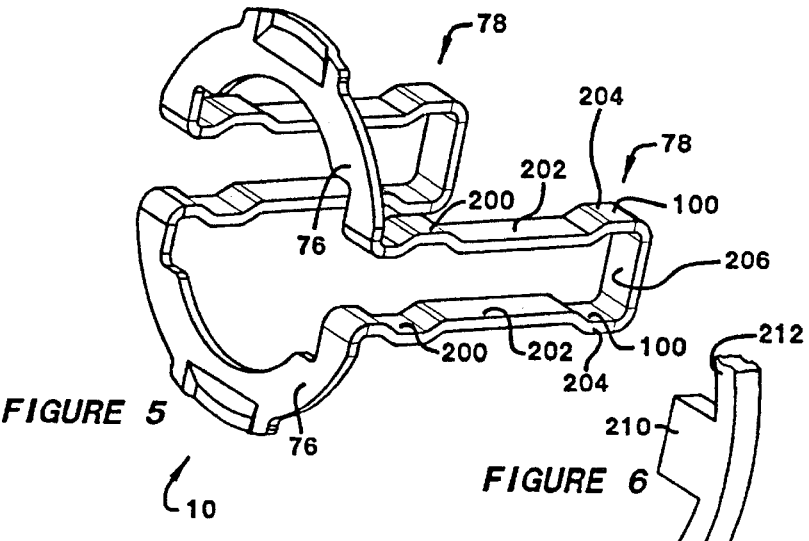
FIGURE 5
FIGURE 6
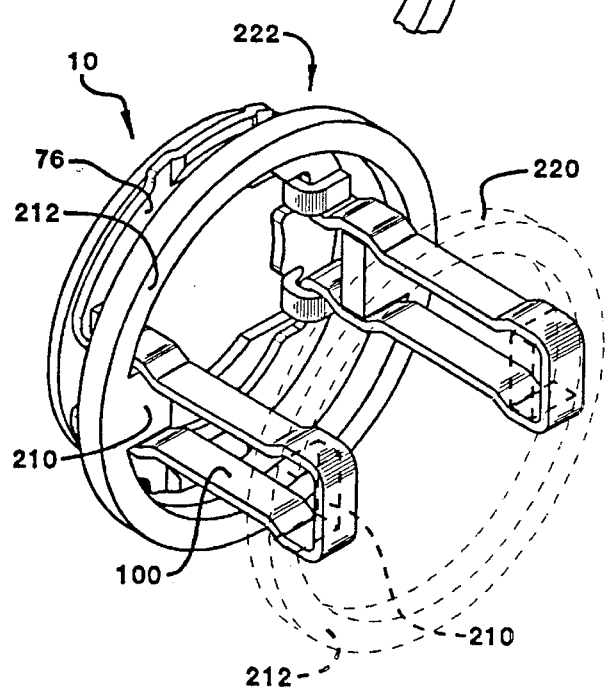
FIGURE 7
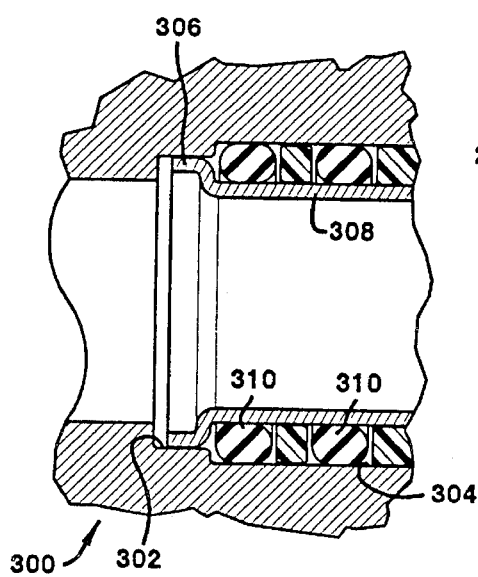
FIGURE 4A

QUICK CONNECTOR

CROSS REFERENCE TO RELATED APPLICATIONS

This is a Continuation-In-Part of Ser. No. PCT/US93/11281, filed Nov. 16, 1993.

BACKGROUND OF THE INVENTION

This invention relates generally to conduit couplings through which fluid flows and specifically to a quick connector which retains a male conduit within a female receptacle.

In the automotive industry, as well as for many other industries, the need always exists for low cost, reliable and easy to assemble components. This need is especially apparent with respect to providing a connection between fluid conveying conduits, such as fuel, brake or refrigerant lines. Traditionally, such a connection is comprised of a male conduit being retained within a female receptacle through use of threaded fittings, flare fittings or through bolted on flanges.

More recently, a variety of snap together quick connect retainers have been used in place of the conventional methods. These quick connectors typically have a plurality of flexible legs which engage an annular bead attached to a male conduit and also engage an undercut groove formed within a female member. Two such examples are disclosed in U.S. Pat. No. 4,601,497 entitled "Swivelable Quick Connector Assembly" which issued on Jul. 22, 1986, and U.S. Pat. No. 4,778,203 entitled "Swivelable Quick Connector for High Temperature Connection" which issued on Oct. 18, 1988, both of which were invented by the inventor of the present invention and are incorporated by reference herewithin. Another quick connector is flat with pairs of annular arms extending therearound which are radially flexible. Other quick connectors which were invented by the inventor of the present invention are disclosed in U.S. Pat. Nos. 4,524,995 and 4,423,892, both of which are entitled "Swivelable Quick Connector Assembly" and which issued on Jun. 25, 1985 and Jan. 23, 1984, respectively, and are incorporated by reference herewithin.

While the aforementioned quick connectors present significant improvements in the art, each leg member of these devices must typically resist longitudinal pull out forces and must generate radial retention forces. Moreover, the legs are radially compressed during installation. Accordingly, in order to enhance the ability to either withstand forces in the longitudinal direction or generate radially directed forces, the part must often be compromised with regard to the other force perpendicular thereto. Therefore, it would be desirable to have a quick connector which can be easily installed and removed, is inexpensive to manufacture and which has separate segments for withstanding longitudinal pull out forces and generating radial retention forces, but which can be much shorter than conventional connectors by reducing the length inside the female portion of the connector to the length currently realized with threaded connectors.

SUMMARY OF THE INVENTION

In accordance with the present invention, a preferred embodiment of a new and useful quick connector is used to couple a male conduit within a bore of a female receptacle. The quick connector has a pair of waist segments, a shoulder segment, a body segment with an aperture therein, and a leg segment. The leg segment is defined by a pair of projecting elements which urge the waist segments radially outward for engagement with the female receptacle. The projecting elements are also partially compressible toward one another thereby causing the pair of waist segments to move toward one another for installation and disassembly. The aperture within the body segment engagably surrounds a portion of the male conduit.

The quick connector of the present invention is advantageous over the prior art quick connectors in that the waist segments and shoulder segment are optimized to withstand radially compressive insertion and removal forces while transmitting radial retention forces in association with the female receptacle. Concurrently, the body segment is optimized to withstand longitudinal pull out forces between the attached male conduit and the adjacent waist segments. Furthermore, the present invention quick connector can be easily assembled and disassembled from within the mating female receptacle, thus, providing an inexpensive to assemble system. This is accomplished by at least partially compressing the projecting elements of the leg segment toward one another thereby engaging and disengaging the quick connector from the mating female receptacle. Additionally, the present invention can be inexpensively manufactured. Also, the quick connector is operable with most conventional swivelable male conduits and with many traditional female receptacles, so as to convert the rigidly fixed conduit of conventional threaded connectors to a swivelling type connection. These quick connectors of the present invention have separated the springing radial requirement from the requirement to longitudinally abut a wall in the female receptacle. The quick connector of the present invention maintains the male conduit in alignment within the female receptacle thereby providing proper registry of a seal. The present invention is also beneficial since it allows the male conduit and female receptacle to incorporate longitudinally smaller sealing and retaining areas than those associated with traditional couplings. Additional advantages and features of the present invention will become apparent from the following description and appended claims, taken in conjunction with the accompanying drawings.

BRIEF DESCRIPTION OF THE DRAWINGS

FIG. 1 is a perspective view showing a first preferred embodiment of a quick connector of the present invention;

FIG. 2 is a perspective view showing a radial member of the first preferred embodiment of the present invention quick connector of FIG. 1;

FIG. 3 is a perspective view showing a body segment of the first preferred embodiment of the present invention quick connector of FIG. 1;

FIG. 4 is a sectional view, taken along line 4—4 of FIG. 1, showing another embodiment of the first preferred embodiment of the present invention quick connector in relation to a male conduit and a female receptacle;

FIG. 4A is a sectional view, similar to that of FIG. 4, showing another embodiment of the female receptacle and another embodiment of a male conduit within which the first preferred embodiment of the present invention quick connector of FIG. 1 is employed;

FIG. 5 is a perspective view, opposite from that of FIG. 2, showing a radial member of a second preferred embodiment of the present invention quick connector of FIG. 1;

FIG. 6 is a fragmentary perspective view showing a locking member used in combination with the second preferred embodiment of the present invention quick connector of FIG. 5;

FIG. 7 is a perspective view, showing the locking member of FIG. 6 assembled to the second preferred embodiment of the present invention quick connector of FIG. 5;

DETAILED DESCRIPTION OF THE PREFERRED EMBODIMENTS

Figure 9:
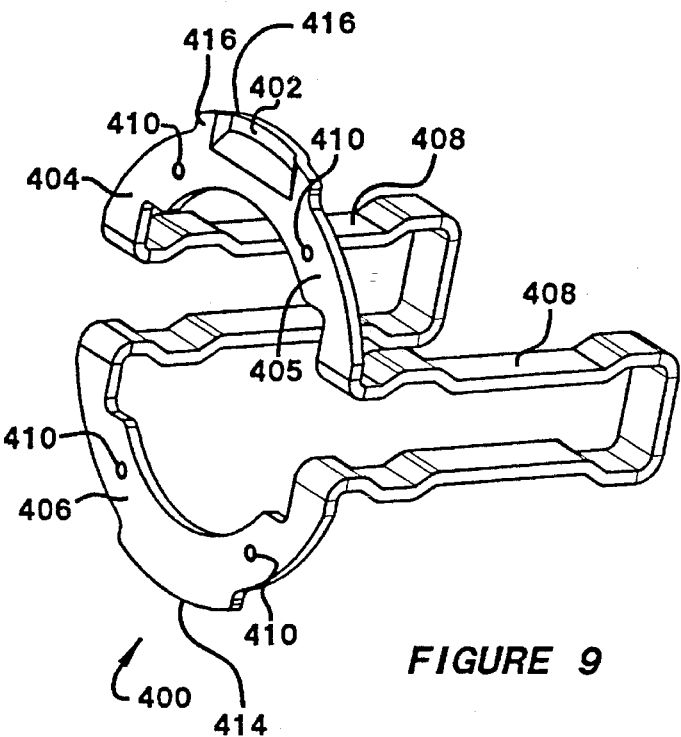
FIG. 9 is a perspective view, similar to that of FIG. 5, showing a third preferred embodiment of the radial member of the present invention quick connector of FIG. 1.

In the automotive industry the need exists for coupling a male tubular member or conduit to a female receptacle. For example, coolant hoses and oil hoses must be connected to a radiator or an engine block. Furthermore, brake hoses often need to be coupled to one another. Referring to FIGS. 1 through 4, a preferred embodiment of a quick connector 10 is used to operably retain a swivelable male conduit 12 to a female receptacle 14. A first preferred embodiment of male conduit 12 is a rigid metallic member having a connecting portion 20, a bulged portion 22, a coined recessed portion 24 and a flanged portion 26 proximate with a distal end 28 thereof. Male conduit 12 further has an annular bead or bushing 30 circumferentially attached therearound. A pair of O-ring seals 32 and an annular washer 34 are longitudinally juxtapositioned between bushing 30 and flanged portion 26 so as to circumferentially surround recessed portion 24. In coordination therewith, female receptacle 14 has an outboard face 40, a frusto-conical chamfered lead-in section 42, an annular ridge section 44, a retaining formation or more specifically an undercut groove 46 within which there is an outboard abutting wall 48 and an inboard abutting wall 50, an annular recessed section 52, a frusto-conical median section 54, a bore 56 defined by a cylindrical inside surface, and a passageway 58.

Quick connector 10 is defined by a radial member 70 and a body segment 72. As can best be observed in FIGS. 1, 2 and 4, radial member 70 further has a pair of shoulder segments 74, a plurality of waist segments 76, 77, 79 and 81, and a pair of leg segments 78. Each shoulder segment 74 has a pair of flanges 80 from which project three angled side walls 82 joined by a median wall 84, all of which are bordered by a distal edge 86. Moreover, each leg segment 78 has a pair of projecting elements 100 which project perpendicular from each adjacent waist segment 76, 77, 79 and 81. Each projecting element 100 is connected at a distal end 102 thereof by a truss element 104. Portions 100, 102 and 104 provide compressible outwardly springing action. Waist segments 76, 77, 79 and 81 define an opening 110 which has two partially cylindrical interior edges 112 and four corner areas 114. Each shoulder segment 74, the adjacent pair of waist segments 76 and 77, and the adjacent pair of projecting elements 100 are separated from the symmetrically opposing shoulder segment 74, waist segments 79 and 81, and projecting elements 100, by a pair of gaps 116. Accordingly, projecting elements 100 can be radially compressed toward one another such that shoulder segments 74 are radially translatable toward each other. Leg segments 78 are also configured to urge shoulder segments 74 outward away from one another.

Referring to FIGS. 1, 3 and 4, body segment 72 has a pair of substantially flat faces 150 and 152 bordered by an annular peripheral edge 154 and an internal aperture 156 defined by an inner edge. Four bendable tabs 158 also project from the inner edge surrounding aperture 156. When body segment 72 is assembled to radial member 70, face 150 is mounted adjacent to waist segments 76, 77, 79 and 81 opposite from leg segments 78. Tabs 158 of body segment 72 are then aligned with corner areas 114 of radial member 70 and folded over upon a portion of each waist segment 76, 77, 79 and 81 proximate with leg segments 78. Nevertheless, a space 160 is present between an edge 162 of each tab 158 and the abutting wall of corner area 114. This allows waist segments 76 and 77, 79 and 81, and shoulder segments 74 to be radially translatable toward one another between tabs 158 and face 150 of body segment 72. Both radial portion 70 and body segment 72 are preferably stamped from a sheet of metallic material such as stainless steel.

Aperture 156 of body segment 72 circumferentially surrounds male conduit 12 and is longitudinally trapped between bulged portion 22 and bushing 30. This is best shown in FIGS. 1 and 4. Furthermore, peripheral edge 154 of body segment 72 has a smaller diametral dimension than does annular ridge section 44 and annular recessed section 52 of female receptacle 14. Accordingly, body segment 72 serves as a longitudinal and radial retention means between male conduit 12 and radial member 70. During insertion of radial member 70 within female receptacle 14, chamfered section 42 serves to radially compress shoulder segments 74 toward one another. Subsequently, leg segments 78 urge shoulder segments 74 radially outward to engage undercut groove 46. Each shoulder segment 74 has an interface portion 163 which operably engages abutting walls 48 and 50 of female receptacle 14. Thus, radial member 70 is designed to provide radially expansive retention forces to retain body segment 72 to female receptacle 14.

An alternate embodiment of a female receptacle 300 is shown in FIG. 4A. This female receptacle 300 has a slightly constricted diameter bore 302 and a nominal diameter bore 304. In registry therewith, a flanged portion 306 of a male conduit 308 has a diameter corresponding to constricted diameter bore 302. This provides for improved retention of a pair of O-ring seals 310 prior to installation of male conduit 308 into female receptacle 300.

Figure 8:
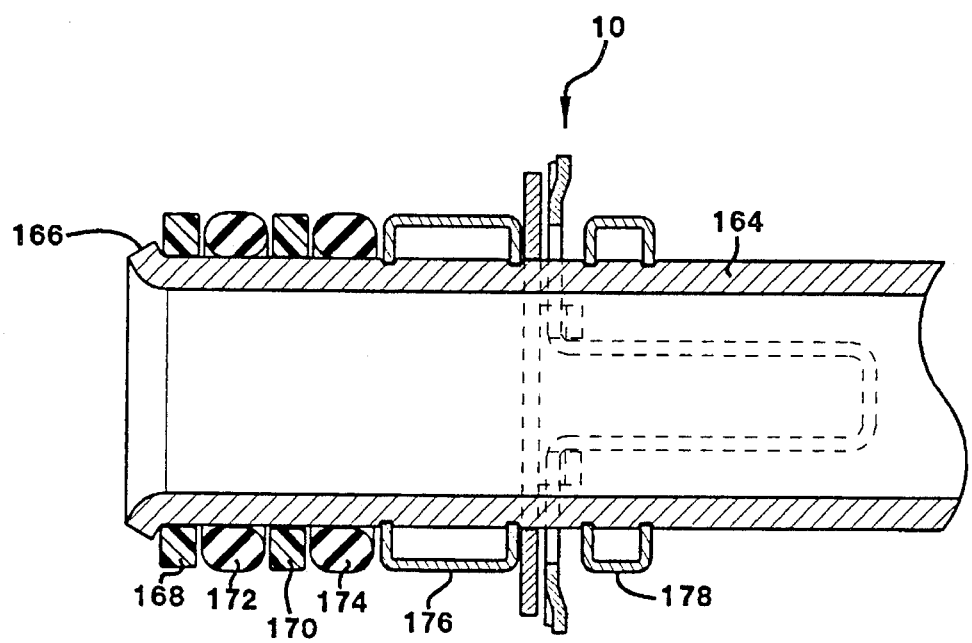
FIG. 8 is a sectional view, similar to that of FIG. 4, showing the first preferred embodiment of the present invention quick connector of FIG. 1 used with a further embodiment of the male conduit.
Figure 11:
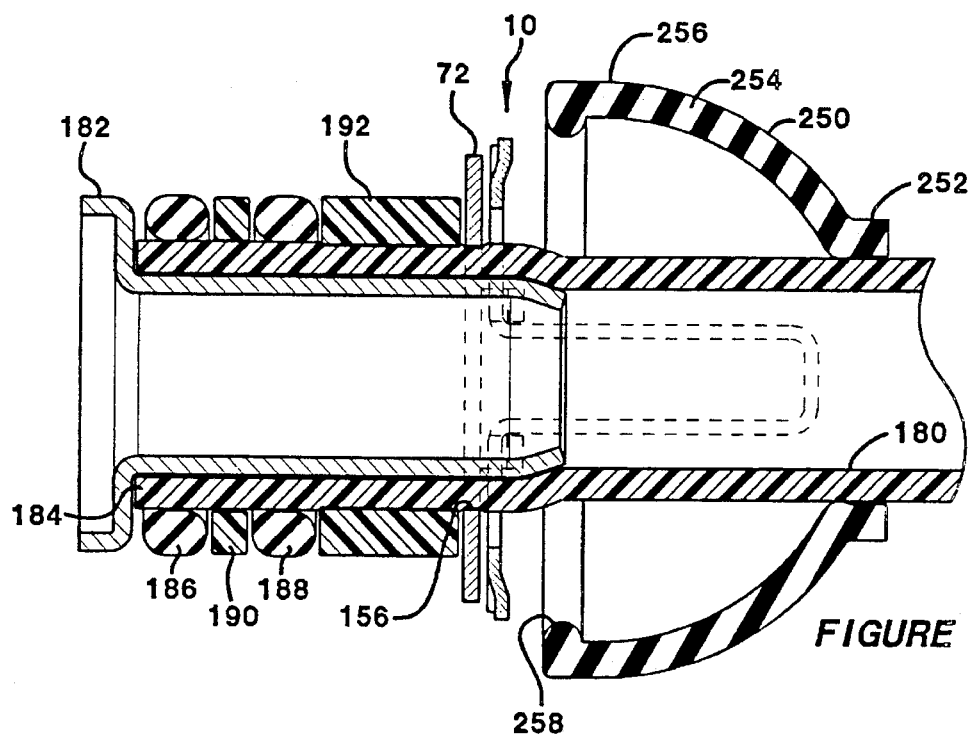
FIG. 11 is a sectional view, similar to that of FIG. 4, showing a dust cover used in combination with the first preferred embodiment of the present invention quick connector of FIG. 1 in relation to yet another embodiment male conduit.

The male conduit assemblies of FIGS. 8 and 11 can alternatively be used in combination with the present invention quick connector 10. In FIG. 8 a male conduit 164 has a flared distal end 166 against which is located a pair of washers 168 and 170, and a pair of annular elastomeric seals 172 and 174. Furthermore, a first bushing 176 serves to prevent longitudinal movement of seal 174 and quick connector 10. Longitudinal movement of quick connector 10 may also be prevented by a second bushing 178. Thus, bushings 176 and 178 are secured around male conduit 164 in order to longitudinally trap quick connector 10 therebetween.

Referring to FIG. 11, a polymeric or rubber male conduit 180 is illustrated as having a flanged ferrule 182 inserted into a distal end 184 thereof. A pair of elastomeric seals 186 and 188 and a washer 190 are juxtapositioned proximate with distal end 184. Ferrule 182 serves to expand the diameter of male conduit 180 after installation of quick connector 10 thereon so as to cause the inner edge surrounding aperture 156 of the quick connector's body segment 72 to be compressibly attached therewith. A bushing 192 is also compressibly attached around male conduit 180 by employing ferrule 182 to expand conduit 180.

Another preferred embodiment of leg segments 78 of radial member 70 is shown in FIGS. 5 through 7. Each projecting element 100 has a first outwardly offset formation 200, an adjacent inwardly offset formation 202 and a second outwardly offset formation 204 proximate with a truss element 206. This provides a receiving area for a finger 210 of an annular locking member 212. Locking member 212 is first juxtapositioned in position 220 to allow compression of projecting elements 100 during installation. Locking member is then moved to position 222 after installation of quick connector 10 so as to prevent compression of projecting elements 100 and provide a visual indication that the connector is properly assembled. This prevents inadvertent disassembly of quick connector 10 and male conduit 12 (see FIG. 4) from female receptacle 14 (see FIG. 1) and visual assurance that assembly is completed.

The third preferred embodiment of a radial member 400 employed in the quick connector 10 (see FIG. 1) of the present invention is illustrated in FIG. 9. Radial member has a single shoulder segment 402, a first waist segment 404, a second waist segment 405, a third waist segment 406 and a pair of leg segments 408. Leg segments 408 serve to radially urge shoulder segment 402 and the opposite waist segment 406 into interlocking engagement with female receptacle 14 (see FIG. 4). A peripheral section 414 of waist segment 406 and a peripheral section 416 of shoulder segment 402 serve as interface portions. A plurality of holes 410 are shown in waist segments 404, 405 and 406 so as to aid in use of an installation or disassembly tool (not shown).

Figure 10:
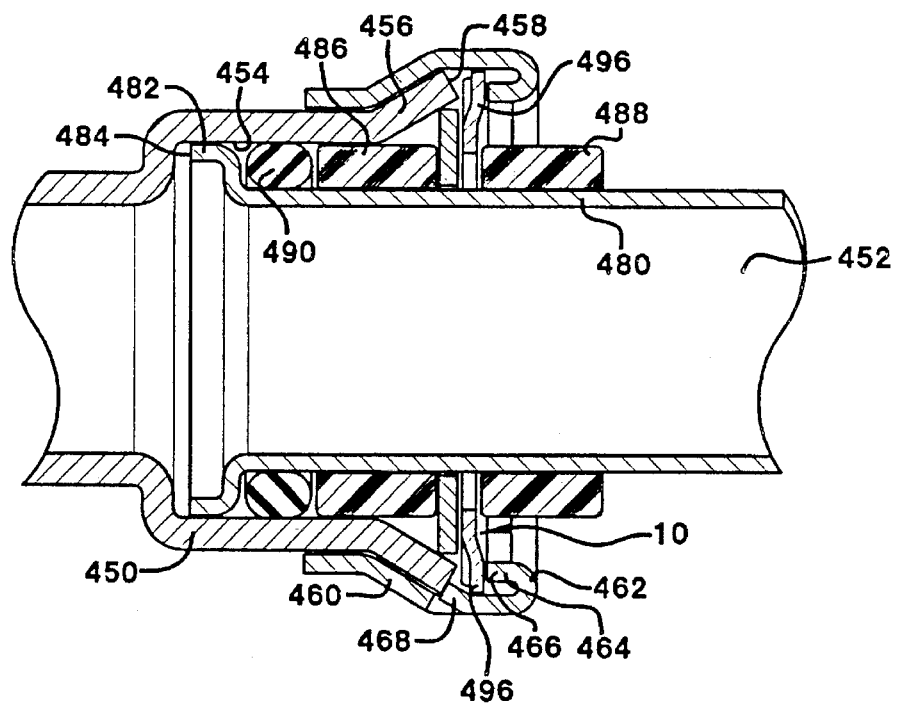
FIG. 10 is a sectional view, similar to that of FIG. 4, showing the first preferred embodiment of the present invention quick connector of FIG. 1 in relation to another embodiment of a male conduit and a female receptacle.

A further embodiment of a female receptacle 450 and a male conduit 452 can be seen in FIG. 10. Female receptacle 450 has a receiving bore 454 and a frusto-conical lead-in portion 456 with a distal edge 458 therearound. A collar 460 snugly surrounds lead-in portion 456. Collar 460 has a turned section 462 and a return arm 464 with an abutting edge 466. A localized foot 468 projects radially inward from collar 460 so as to prevent undesirable longitudinal translation of collar 460 along female receptacle 450. The mating male conduit 452 has a nominal section 480 and a flanged portion 482 proximate with a distal end 484 thereof. A pair of bushings 486 and 488 are securely fastened around nominal section 480 of male conduit 452. An O-ring seal 490 is longitudinally trapped between flanged portion 482 and bushing 486. Also, the first preferred embodiment of quick connector 10 of the present invention is longitudinally trapped between bushings 486 and 488 such that an interface portion 496 is operably engaged between abutting edge 466 and distal edge 458 which act as a retaining formation or means.

Referring again to FIG. 11, a dust cover 250 is shown which prevents contaminating particles from entering bore 56 (see FIG. 4) of female receptacle 14 (see FIG. 4) when quick connector 10 and male conduit 180 are inserted therein. Cover 250 is comprised of an annular hub 252 which engagably surrounds male conduit 180. Hub 252 also can be longitudinally slid therealong. A somewhat parabolic-shaped cup 254 projects outward from annular hub 252. Furthermore, a circumferential outer wall 256 projects from an outermost portion of cup 254. Outer wall 256 is open toward distal end 184 of male conduit 180 and has an inwardly turned lip 258 therein. This inwardly turned lip 258 is interlockably engagable with female receptacle 14 (see FIG. 4) so as to prevent contamination from entering therein. Cover 250 is preferably made from an elastomeric material such as thermoplastic rubber.

While the preferred embodiment of a quick connector has been disclosed, it will be appreciated that various modifications may be made without departing from the present invention. For example, the body segment and the radial member may be integrated as one part. Furthermore, the peripheral edge of the body segment may have a square shape thereto with tabs being inwardly bent therefrom. Alternatively, the shoulder segments and waist segments may slidably overlap each other rather than having a gap therebetween. Also, the sealing means between the male conduit and the female receptacle may be comprised of a single elastomeric O-ring, a pumpable sealant or various other fluid sealing devices as is known within the art. Moreover, a variety of alternative dust cover shapes may be used in combination with a quick connector, male conduit and female receptacle. While specific materials have been disclosed in an exemplary fashion, various other materials may of course be employed. It is intended by the following to cover these and any other departures from the disclosed embodiments which fall within the true spirit of this invention.

The invention claimed is:

1. A quick connector used to couple a male conduit to a female receptacle, said female receptacle having a bore centrally extending therethrough defined by an inside surface therein, said quick connector comprising:

a body segment having an aperture therethrough defined by an inner edge therearound, said inner edge of said body segment surrounding a predetermined portion of said male conduit therewithin;

a pair of waist segments each having an interior edge thereabout, said body segment coupled to said pair of waist segments;

interface portions mounted on said pair of waist segments which attachably engage said female receptacle thereagainst;

a leg segment attached to said pair of waist segments clear of said aperture within said body segment thereof, said leg segment defined by a pair of projecting elements each extending substantially perpendicular to said pair of waist segments such that said leg segment is orientated substantially parallel with a longitudinal axis of said male conduit adjacent thereto; and said leg segment protruding through said bore of said female receptacle so as to be accessible from thereout, said interface portions insertable into said bore of said female receptacle by allowing said pair of projecting members of said leg segment to at least partially compress toward one another, said leg segment further urging said interface portions radially outward so as to be engagably coupled within said female receptacle, said interface portions being disengagable from said female receptacle by at least partially compressing said projecting members of said leg segment toward one another whereby said quick connector can be longitudinally removed from said female receptacle.

2. The quick connector of claim 1 further comprising:

a locking member having a finger extending therefrom insertable and removable between said pair of projecting elements of said leg segment, when inserted said locking member preventing said pair of projecting elements of said leg segment from being compressible toward one another and also preventing said pair of shoulder segments from compressing toward one another thereby preventing inadvertent disengagement of said quick connector from said female receptacle.

3. The quick connector of claim 2 wherein said locking member provides a visual indication that assembly of the connector is complete.

4. The quick connector of claim 2 wherein said locking member, when disposed in said position preventing said pair of projecting elements of said leg segments from being compressible, provides a visual indication that the connector is assembled.

\* \* \* \* \*